Nov. 13, 1928. 1,691,691
J. V. WHITE
MACHINE FOR MAKING BOOK COVERS
Filed Aug. 6, 1927 8 Sheets-Sheet 5
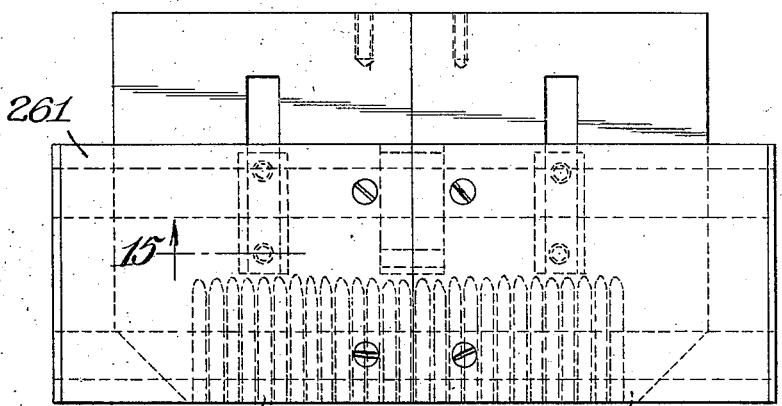
Fig. 13
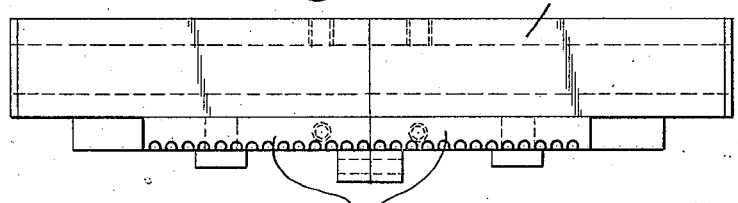
Fig. 14
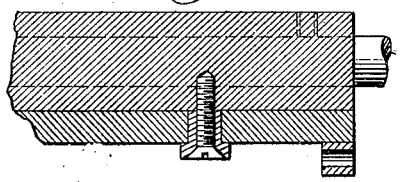
Fig. 15
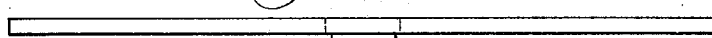
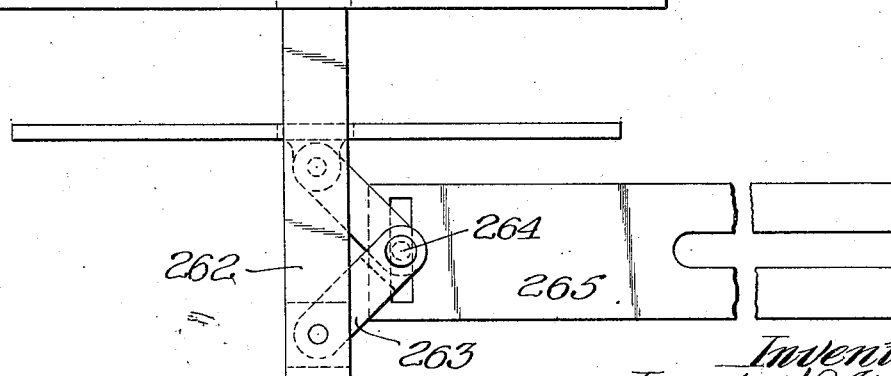
Fig. 16
Inventor
Joseph V. White
By Dyrenforth, Lee Chritton & Wiles
Attys.

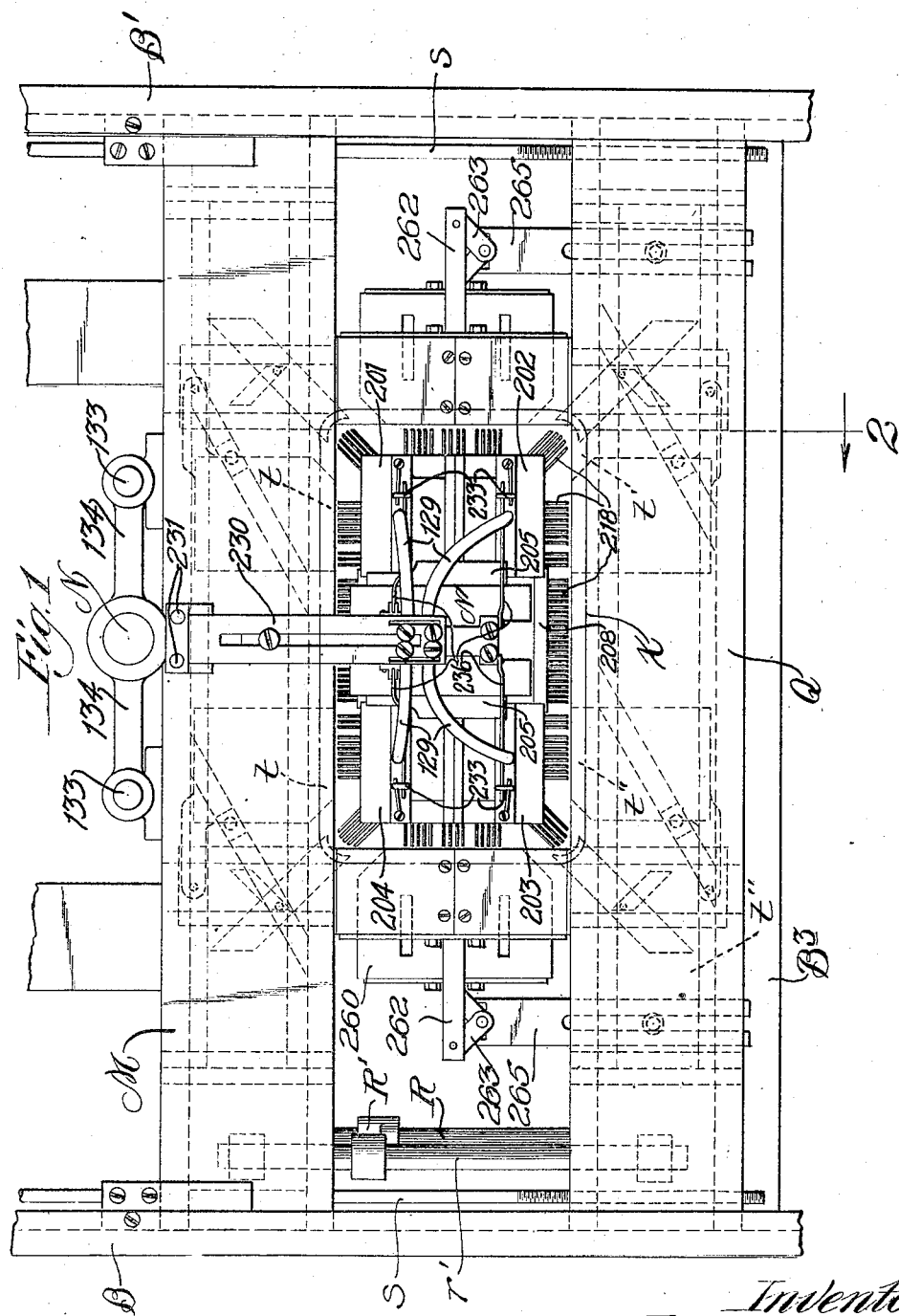

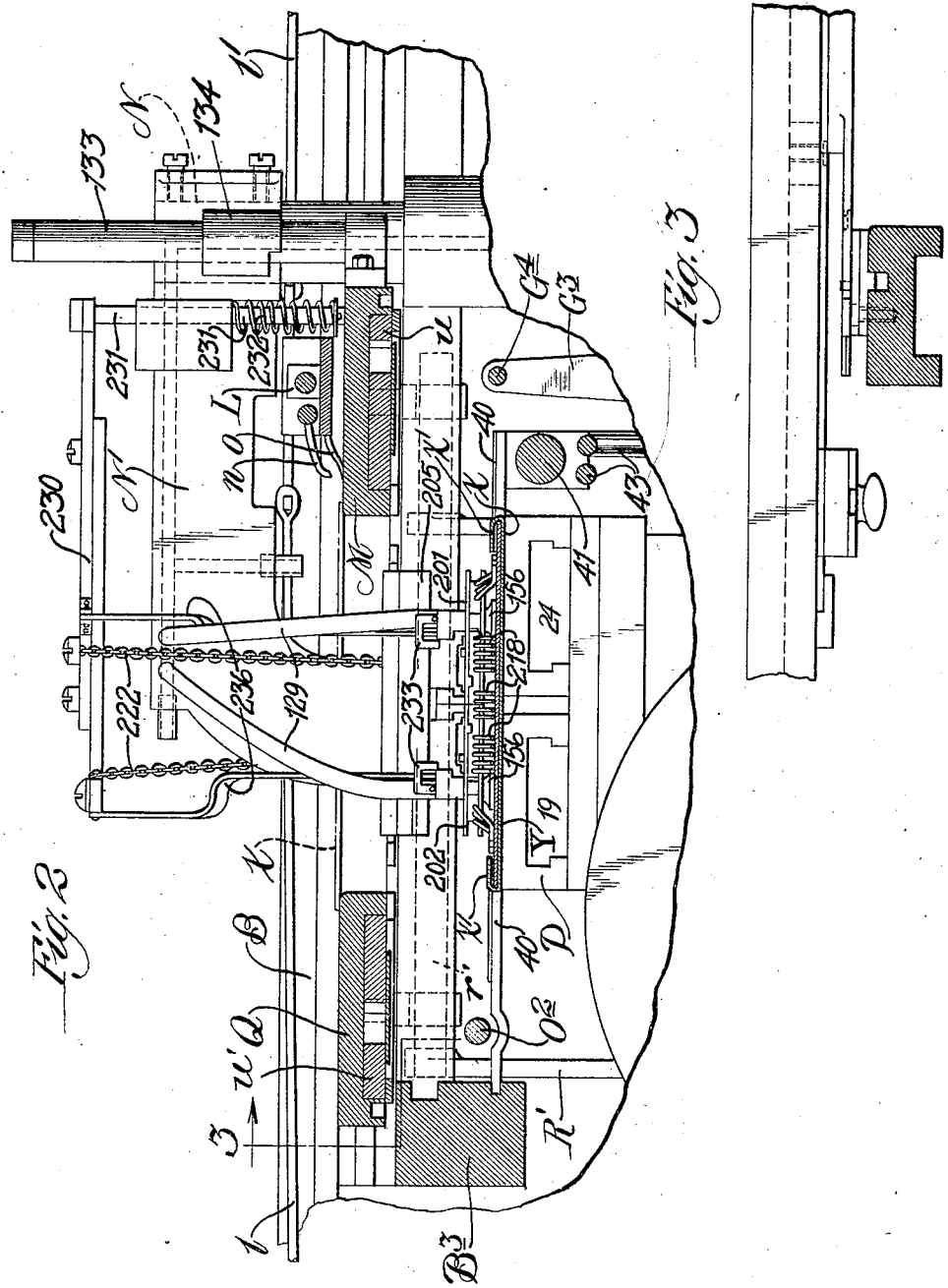

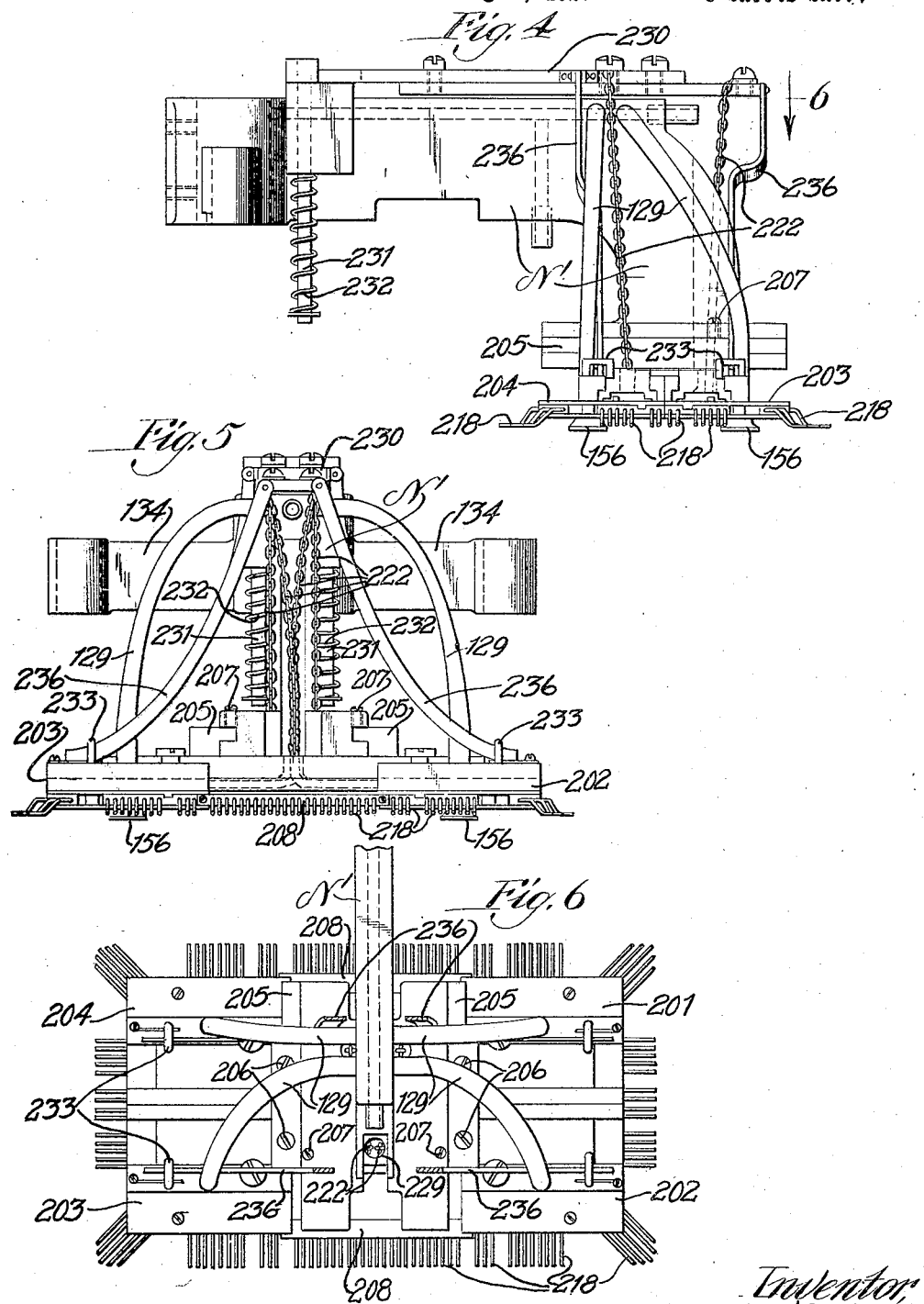

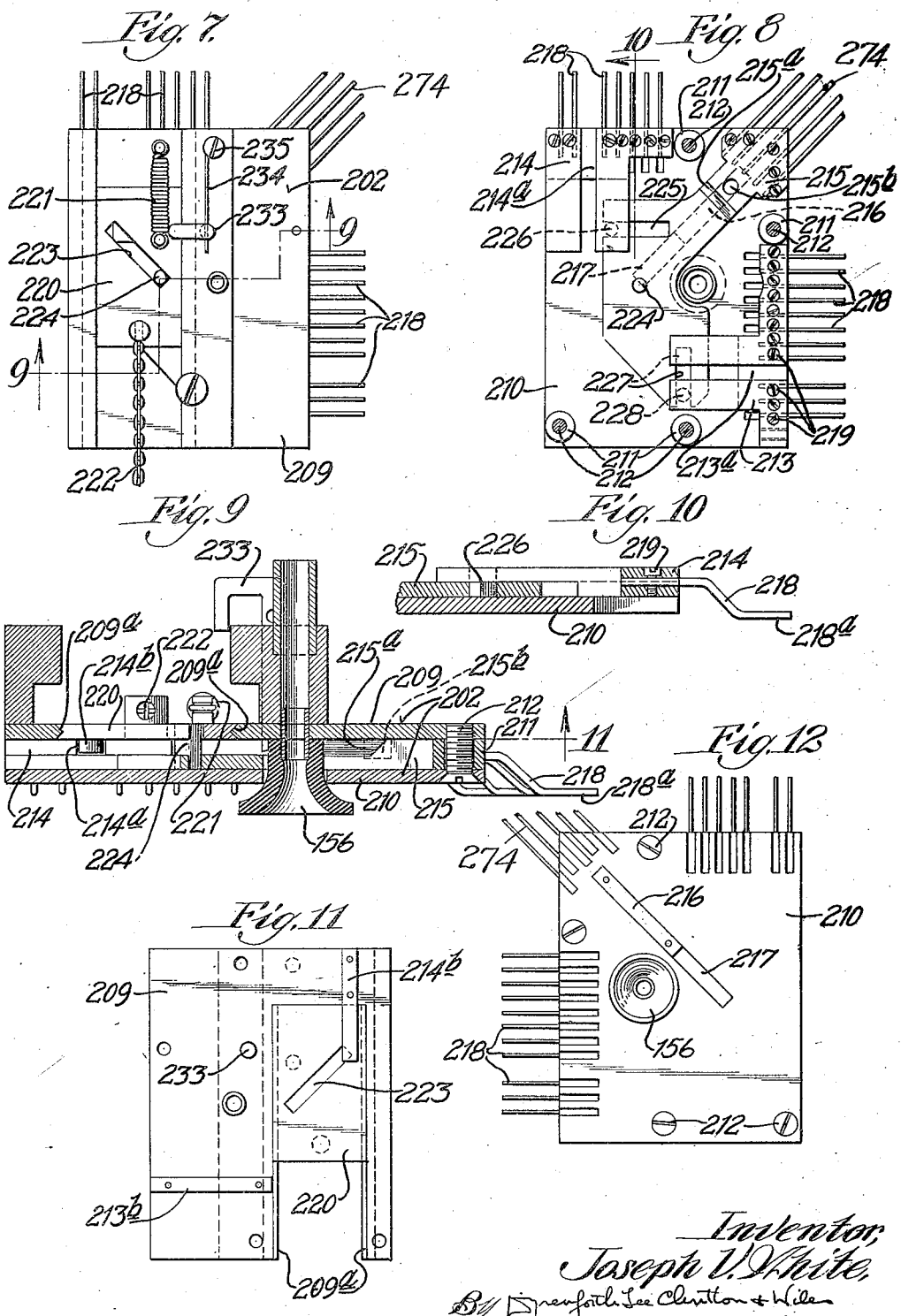

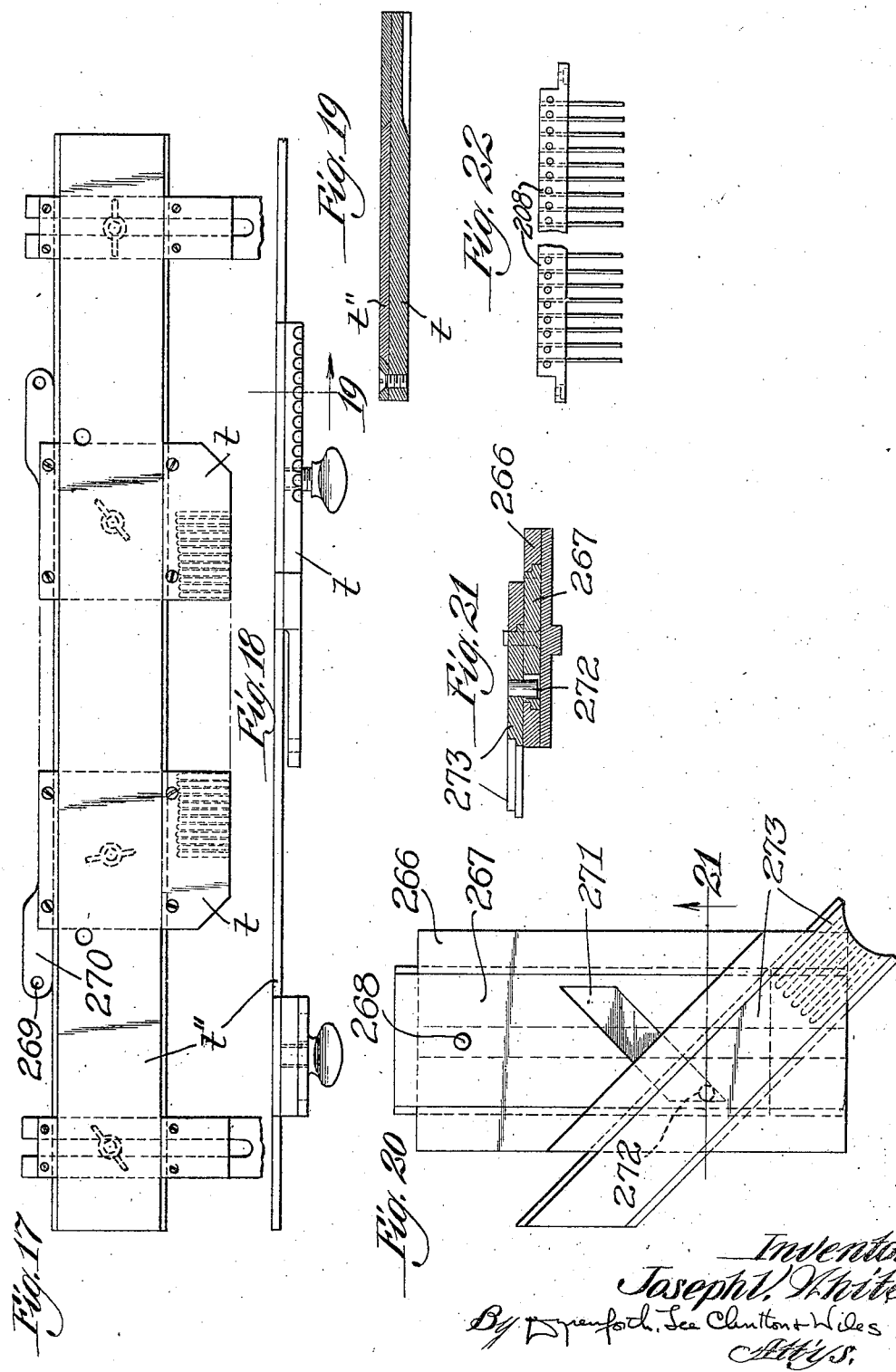

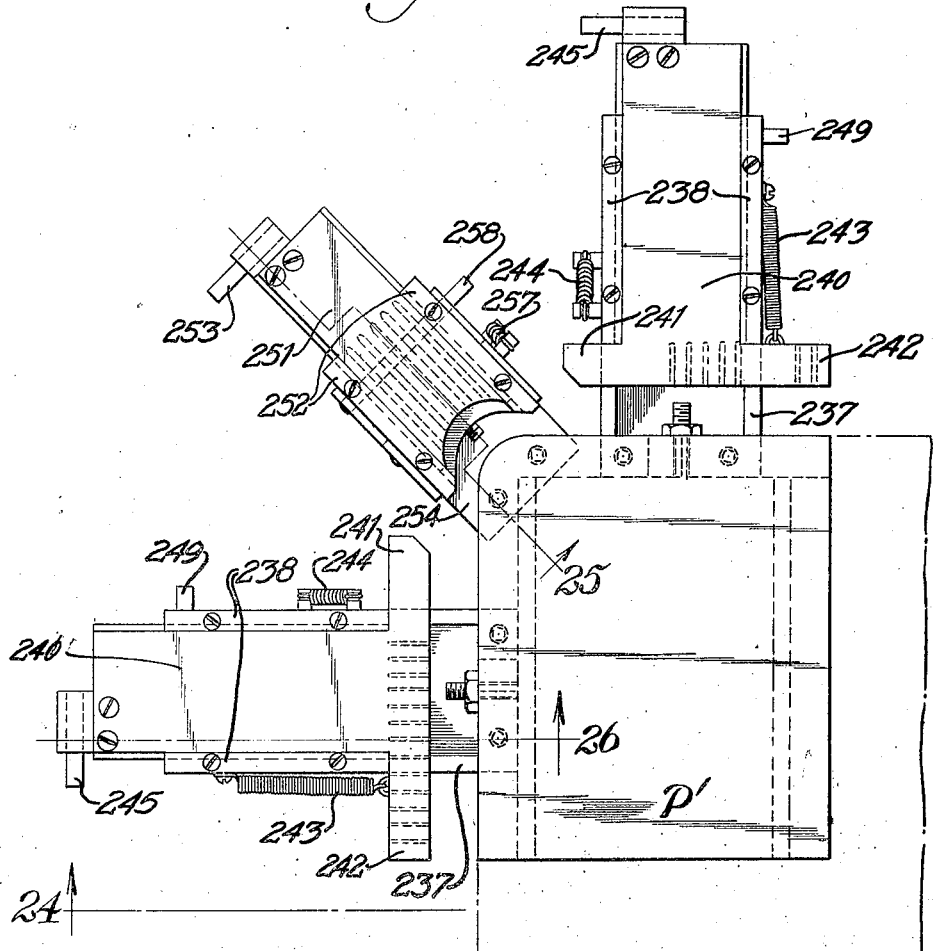
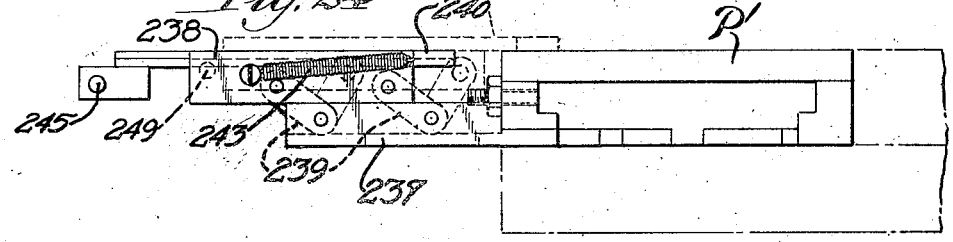

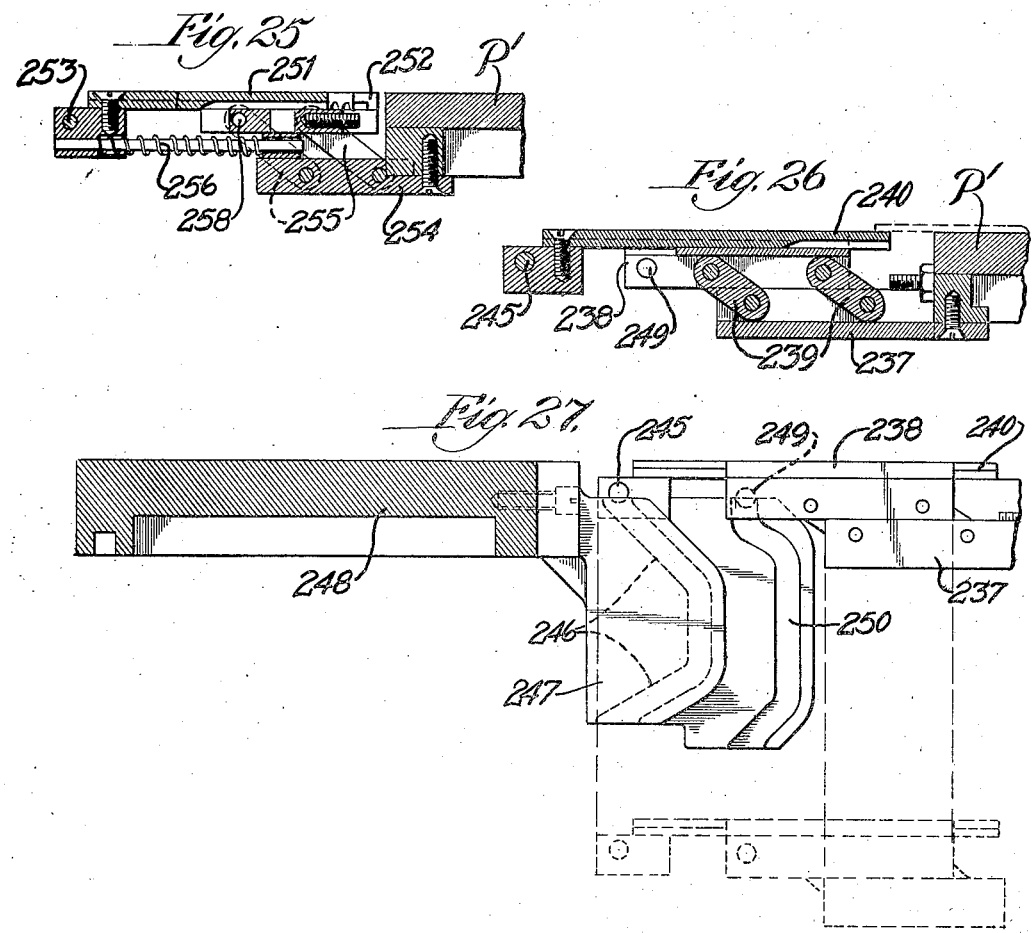

Patented Nov. 13, 1928.

1,691,691

UNITED STATES PATENT OFFICE.

JOSEPH V. WHITE, OF CHICAGO, ILLINOIS.

MACHINE FOR MAKING BOOK COVERS.

Application filed August 6, 1927. Serial No. 211,180

This invention relates to machines for making book covers and the like particularly those having round corners.

Heretofore it has been found to be impractical to construct a machine which would properly fold the leather or fabric cover about the cover boards in the making of books having round corners and consequently books of this character, particularly those having very thin flexible cover boards, have been made by hand. Books of this character are used in considerable numbers as small pocket pass books for banks, pocket note books and the like.

The primary object of this invention is to provide a machine which will properly assemble the cover boards in the flexible cover which has been previously covered with glue or other suitable adhesive, fold the overhanging edges of the flexible cover over the edges of the cover board, at the same time holding down the cover boards upon the flexible cover, neatly fold in the rounded corners of the cover and withdraw the mechanism by which the cover boards are held down.

This and other objects, as will hereinafter appear, are accomplished by this invention which is an improvement on the machine for making book covers which is the invention of A. I. Jacobs and is set forth in Letters Patent No. 580,111 granted April 6, 1897. The present invention is fully described in the following specification and shown in the accompanying drawings, in which:

Figure 1 is a partial top plan view of a machine for making book covers embodying the invention;

Fig. 2 is a partial enlarged section on the line 2 of Fig. 1, which will be better understood by reference to the Fig. 4 of the patent to Jacobs;

Fig. 3 is a partial enlarged section on the line 3 of Fig. 2;

Fig. 4 is a side elevation of the picker head;

Fig. 5 is an end elevation of the same;

Fig. 6 is a top plan view of the picker head as viewed on the line 6 of Fig. 4;

Fig. 7 is a top plan view of one of the corner sections of the picker head removed;

Fig. 8 is a view of the same with the top plate removed;

Fig. 9 is an enlarged section on the broken line 9—9 of Fig. 7;

Fig. 10 is a partial enlarged section on the line 10 of Fig. 8;

Fig. 11 is a view of the top plate as viewed on the line 11 of Fig. 9;

Fig. 12 is a bottom view of the corner section;

Fig. 13 is an enlarged plan view of the grooved strip for folding over the ends of the cover as shown in Fig. 1;

Fig. 14 is an end elevation of the same;

Fig. 15 is a partial section on the line 15 of Fig. 13;

Fig. 16 is an enlarged plan view of the toggle mechanism for forcing in the grooved strips at the ends of the book cover;

Fig. 17 is a top plan view of the sliding bar carrying the grooved strips for folding in the head and tail of the book cover;

Fig. 18 is an enlarged side elevation of the same;

Fig. 19 is a transverse section on the line 19 of Fig. 18;

Fig. 20 is a top plan view of a block carrying the slider for folding in the corner of the cover;

Fig. 21 is a transverse section on the line 21 of Fig. 20;

Fig. 22 is a top plan view of a slug which acts as a filler between two of the corner sections shown in Fig. 6 when the same are spaced for use on larger book covers;

Fig. 23 is a top plan view of a modified form of the invention as applied to the platform of the Jacobs machine;

Fig. 24 is an end elevation of the same as viewed on the line 24 of Fig. 23;

Figs. 25 and 26 are vertical sections on the lines 25 and 26 of Fig. 23; and

Fig. 27 is a view similar to Fig. 24 showing the cam grooves for controlling the action of the folding mechanism.

The invention as illustrated in Figs. 1 to 22 inclusive comprises frames B, B' for carrying a stationary cross bar M and an adjustable folder bar Q. Between these is mounted a platform P which is movable up and down by mechanism not shown, herein, but fully shown in the above mentioned patent to Jacobs. This platform is adjustable to the size of the finished book which is to be folded thereon and when in its uppermost position passes in between the bars M and Q as shown in Fig. 2 and lies flush therewith so as to receive the flexible cover X which is made of fabric, cloth or the like and which has previously been coated on its upper surface with glue or other adhesive.

During the time the cover X is being drawn into place the picker head $N^1$ is raised and turned, as will hereinafter be described. With the picker head out of the way, the strap $l$ draws the slide L to the left in Fig. 2, and the fingers $n$, $o$ grasp it near the edge of the cover X after which the straps $l^1$, of which there are two, one on each side of the frame, pull the slide L back until the flexible cover X lies immediately over the platform P which at that time is raised so as to be level with the bars M and Q. The finger $n$ then raises permitting the cover X to stop in the dotted line position as shown.

During this time the picker head $N^1$ has raised until the arms 134 are free from the vertical guides 133 and has swung around the shaft N until it lies in a position 180° from that shown in Fig. 1. In this position the picker head descends (by mechanism not shown herein) upon the previously positioned pile of cover boards, two of which, one at each side of the picker head, are held by the soft rubber suckers 156 (Fig. 4) which lie on the bottom of the picker head and which are connected to a suction pump (not shown) by means of rubber tubes 129. This pump is so operated so as to produce a vacuum to the suckers 156 from the time the picker head rests upon the top of the previously positioned pile of cover boards until this picker head has again raised and swung back to the position shown in Fig. 1 in which it has pressed these cover boards firmly down upon the glued top of the cover X.

The structure thus far described is that of the Jacobs patent. To the picker head of the Jacobs machine is now added four corner sections 201, 202, 203 and 204 as shown in Fig. 6 which are secured to members 205 by means of screws 206. These members in turn are secured to the bottom of the picker head $N^1$ by means of set screws 207. This arrangement permits the corner sections to be spread in either direction. Fillers 208 are shown between the sections 202 and 203 in Fig. 6 and these are shown in detail in Fig. 22. These fillers are secured to the corner sections by means of screws passing through the offset ends of the filler 208.

The corner section 202 shown in detail in Figs. 7 to 11, comprises top and bottom plates 209 and 210 with spacer collars 211, the whole being secured together by means of screws 212. Movable finger holders 213 and 214 are slidably mounted between the top and bottom plates 209 and 210 while a corner finger holder 215 is mounted at each corner and has a block 216 secured thereto on the lower side, and this block is slidable in a diagonal groove 217 (Fig. 12) in the lower plate 210.

The finger holder 213 carries a number of spring metal fingers 218 which are held in place by any suitable means such as the screws 219. The outer ends $218^a$ of the fingers 218 are bent down slightly below the bottom of the plate 210 so as to exert a pressure upon the cover boards when the picker head is pressed down.

The finger holder 213 is guided by a slot $213^a$ into which fits a guide bar $213^b$ as shown in Fig. 11. Similarly the finger holder 214 has a slot $214^a$ which fits over the guide bar $214^b$.

The mechanism for drawing the fingers inwardly in order to cause them to be withdrawn from beneath the folded over edges of the cover will now be described. The top plate 209 has a guideway $209^a$ into which is slidably fitted a block 220 which is normally held in the position shown in Fig. 7, by means of the helical spring 221. This block is drawn in against the action of the spring 221 by means of the pull chain 222, the action of which will later be described. The block 220 has a slot 223 which extends across it at substantially a 45° angle. In this slot extends a pin 224 which is carried by the finger holder 215. Thus it will be seen that as the block 220 is moved back and forth under the action of the chain 222 and of the spring 221, the bar 224 sliding in the slot 223 will cause the finger holder 215 to move back and forth along the guideway 217.

The finger holder 215 is provided with a laterally extending slot 225 which engages a pin 226 on the finger holder 214. Thus, as the finger holder 215 is drawn inwardly the slot 225 acting on the pin 226 moves the finger holder 214 in. Similarly a slot 227 on the other side of the finger holder 215 engages a pin 228 on the finger holder 213 which gives the latter a movement similar to that of the finger holder 214.

The pull chain 222 extends up through an opening 229 (Fig. 6) and is secured at its upper end to a bar 230 which is carried upon the picker head $N^1$ by means of two parallel vertical rods 231 (Fig. 4) which are guided in suitable openings in the picker head, the bar 230 being normally held down by means of compression springs 232. When the picker head descends a predetermined distance as shown in Fig. 2, the rods 231 strike the top of the stationary bar M thereby lifting the bar 230 and pulling up on the chain 222, and pulling in the fingers 218 as shown in Fig. 2 so as to withdraw them completely from the folded over edges X¹ of the cover.

It is necessary to lock these fingers in this position so as to permit the picker head to be lifted away from the case or cover. The details of this lock will be seen in Figs. 7 to 9. The corner finger holder 215 is provided with an inclined surface 215$^a$ and the upper thicker portion of this holder has a hole 215$^b$. A locking pin 233 passes through the top of the lower portion of the finger holder 215 and is pressed thereagainst by means of wire spring 234 which is held by means of a screw 235. Thus, when the finger holder 215 as it is drawn in, the locking pin 233 rides up over the inclined surface 215$^a$ and the pin 233 is forced into the hole 215$^b$ by the spring 234. While so held the picker head can be raised bodily from the cover which has just been folded as shown in Fig. 2, the suction on the tubes 129 having previously been released.

To release this locking mechanism I have provided releasing fingers 236 which are carried by the bar 230 and which pass under the locking pins 233 and lift them as the picker head N¹ moves up toward the bar 230. The picker head N¹ now moves up to a position above the bars M and Q and swings around as has been previously described, until it is again above the pile of cover boards where it will pick up two more boards and the operations previously explained are repeated.

As the picker head N¹ ascends, the folded cover is pushed off the top of the platform P by means of a discharging slide 40 which is guided on the rod 41 and operated by means of a belt 43. The slide 40 then returns and the platform is raised to the level of the bars M and Q and the series of operations previously described is repeated.

The front folder-bar Q, Figs. 2 and 4, is adjustable toward and from the central cross-bar M by the screws S, that extend to the rear of the machine, Figs. 1 and 5, and are driven by a cross-shaft (not shown) and the parts are adjusted so that the space between the edges of the front folder-bar Q and the central cross-bar M corresponds to the measurements of the cover from the top to the bottom edges. Hence the fabric is folded up by coming against these bars M and Q as the platform is pushed down by the picker, and then the edge-turners $t\ t'$ (Figs. 1 and 17) are moved toward each other by an end motion given by an end motion given to the slide cam-bars $u\ u'$, in which are diagonal slots receiving blocks with pins connected to the edge-turners $t\ t'$, which are adjustably carried on bars $t''$. These slide cam-bars receive motion simultaneously from the rock-shaft R and arms R', that have a rod $r'$ at their upper ends, passing into forks depending from the slide cam-bars $u\ u'$, and the rock-shaft R receives a reciprocating motion from a cam as shown in the patent to Jacobs.

As the cam-bars $u, u'$ move to the right in Fig. 1, the diagonal slots force the edge-turners to $t, t'$ inwardly over the fingers 218, the edge-turners or folding-in members $t, t'$ having grooves on their lower surfaces adapted to lie over and registering with these fingers. Thus, as the edge-turners move inwardly after the top of the platform P has passed a little below the level of the edge-turners $t, t'$, the edge-turners force the vertical margins X' of the book cover and press them down upon the outer-edge of the cover-board Y which has substantially the contour of the outer ends of the fingers 218 (Fig. 1). The members $t, t$ are adjustably mounted on the bar $t''$ and secured thereon by means of thumb-screws. This bar is moved laterally by means of the diagonal slots previously referred to.

End edge-turners 260 are slidably mounted between the bars M and Q on a member 261 which is held between these bars. A strut 262 (Figs. 1 and 16) is secured to the member 261 and is pivotally connected to one end of a toggle-joint 263. The other end of the toggle-joint is pivotally connected to the edge-turner members 260. The central pin 264 of the toggle is connected to the rod 265 which is adjustably mounted on the bar $t''$ carried by the bar Q. As the bar $t''$ moves in, the rod 265 straightens out the toggle thereby forcing the edge-turners 260 inwardly and causing them to turn in the end margins of the book cover.

The bars M and Q also adjustably carry at each end a block 266 which has a guideway therein in which is slidably mounted a slide 261 which has a pin 268 which lies in a hole 269 in the arm 270 carried by the member $t$. Thus, as the member $t$ is moved back and forth the block 266 is also moved parallel thereto.

The block 266 has a diagonal guideway 271 in which operates a pin 272 on the corner edge-turner 273 which is slidably mounted in the block 266 preferably at an angle of 45° to the motion of the slide 267. This corner member has a series of grooves running parallel to its length and the underside. These grooves are adapted to overlie the corner fingers 274 carried by the finger holder 215 (Fig. 8).

After the side and end edge-turners have operated to fold in the side and end margins X' of the cover, corner members 273 move in to fold the corners. Owing to the fact that the guideway 271 is wider than the pin 272, the member 273 does not move until the guide 267 has moved some distance and the corner members therefor act after the side and end members have folded over these margins.

Thus, it will be seen that the cover is made by having its top, bottom and side margins folded over the edges of the cover boards after which the rounded corners, which have previously been raised about the rounded edges of the cover boards are folded in. The side margins while being folded in are pressed down in what might be termed a series of "pleats" between the spaced parallel fingers 218, thereby pressing together two glued surfaces of the flexible cover fabric. Immediately after pressing in the top, bottom and side edges, the previously rounded corners are forced in and pressed down between parallel fingers carried by the corner finger holders 215, thereby forming a series of substantially parallel pleats which lie substantially at a 45° angle to both the adjacent straight edges.

Thus it will be seen that a machine has been provided which is rapid and substantially automatic in its operation and which in actual practice has been found to neatly and successfully perform an operation which has heretofore been considered necessarily a manual one, particularly where the so-called cover boards were quite thin and flexible so that of themselves they do not provide a still edge over which the flexible cover fabric could be folded.

In Figs. 23 to 27 inclusive is shown a modification of the device in which the platform P¹ carries its own side folders, the picker head being the same as that which has previously been described. To the sides and ends of the platform P¹ are secured laterally extending arms 237 which lie some distance below the top of the platform P¹ and are adapted to carry guide blocks 238 which are hingedly secured thereto by means of parallel links 239.

An edge-turner 240 is slidably mounted in each guide block 238 and lateral extensions 241 and 242, the turner 240 normally being held retracted by means of a spring 243. A spring 244 acting between the guide block 238 and the arms 237 normally holds the guide block back in the position shown in Fig. 24.

The turner 240 carries a pin 245 which is adapted to engage a cam groove 246 in the member 247 as shown in Fig. 27, which is carried upon a stationary bar 248, the bars M and Q of the other machine being removed in this construction.

When the platform P¹ reaches its highest point the parts are in the position shown in Fig. 27 in which the top of the edge turner 240 is level with the top of the bar 248 so that the glued cover can be readily slipped thereoff and onto the platform P¹, the outer edge of the cover resting upon the inner end of the edge turner 240.

The guide block 238 carries a pin 249 which engages the cam groove 250 in the member 248. As the platform P¹ descends the pin 245 following the cam groove 246 forces the edge turner 240 straight in until it is near the outer edge of the platform P¹. About this time the pin 249 following the cam groove 250 begins to move in thereby following the guide block 238 upwardly and inwardly about the links 239. This movement lifts the outer edge of the book cover (not shown) and the further movement of the pin 245 in the cam 246 forces the turner 240 over the top of the folding over margin of the cover. The under surface of the turner 240 is serrated to match the fingers 218 of the picker head so that the margin thus folded over and pressed down between these fingers is left serrated and will retain this serrated appearance after the fingers have been withdrawn as has been previously described.

In the same way the corner is folded in by means of a member 251 which is slidably mounted in the guide block 252 and has a guide pin 253 operating in the cam groove of a stationary block, not shown. The guide block 252 is carried upon an arm 254 by means of parallel links 255. A spring 256 normally holds the member 251 in its outermost position as shown in Fig. 25, while a spring 257 holds the guide block 252 in the retracted position. The guide block 252 carries a pin 258 which together with the pin 253 engage cam grooves similar to those shown in the block 247 for forcing the corner of the cover upwardly and inwardly, fluting the same and pressing it down between the corner fingers of the picker head.

It will be understood, however, that the top and side edge turners 240 act in advance of the corner member 251 so that the corner is folded in and pressed down after the top and side folds have been made.

After this folding operation is completed the pins 245 and 249 continuing down through the cam grooves 236 and 250 are returned to the original normal positions thereby withdrawing the folder members and permitting the top slide 40 to force the folded cover off the platform P¹.

In both the forms which have been described, the folded cover then passes to one side of the machine where it is firmly pressed while a new cover is being assembled and folded.

While I have shown and described but a few embodiments of this invention, it is to be understood that it is capable of many modifications. Changes therefore in the construction and arrangement may be made which do not depart from the spirit and scope of the invention as disclosed in the appended claims.

I claim:

1. In a case-making machine, edge-turners for folding a flexible cover over the edges of cover-boards, spaced radial fingers for supporting the edges of the cover-boards, means for pressing said cover down between the fingers, and means for withdrawing said fingers after the edges of the cover are folded in and pressed down between said fingers.

2. In a case-making machine, edge-turners for folding a flexible cover over the edges of cover boards, spaced radial fingers for supporting the edges of the cover-boards, means movable inwardly parallel to said fingers for pressing said cover down between the fingers, and means for withdrawing said fingers after the edges of the cover are folded in and pressed down between said fingers.

3. In a case-making machine, edge-turners for folding a flexible cover over the edges of cover-boards, spaced radial fingers for supporting the edges of the cover-boards, means having a grooved surface passing over said fingers for pressing said cover down between the fingers, and means for withdrawing said fingers after the edges of the cover are folded in and pressed down between said fingers.

4. In a case-making machine, edge-turners for folding a flexible cover over the edges of cover-boards, spaced radial fingers for supporting the edges of the cover-boards, means for pressing said cover down between the fingers, and means for withdrawing said fingers after the edges of the cover are folded in and pressed down between said fingers and before said pressing means is withdrawn.

5. In a case-making machine, a picker head adapted to swing to one position to pick up cover-boards and to another to deposit them on a glued cover, radiating pins on said picker head, means for forcing said cover up and for folding it over the edges of the cover-boards, said means for folding having grooves in the face registering with the pins and adapted to overlie the same so as to cause the folded-over edge to be forced into contact with the glued cover between said pins, and means for withdrawing said pins inwardly.

6. In a case-making machine, a picker head adapted to swing to one position to pick up cover-boards and to another to deposit them on a glued cover, radiating pins on said picker head, the ends of the pins being adapted to lie substantially at the edge of the cover-boards, means for forcing said cover up and for folding it over the edges of the cover-boards, said means for folding having grooves in the face registering with the pins and adapted to overlie the same so as to cause the folded-over edge to be forced into contact with the glued cover between said pins, and means for withdrawing said pins inwardly.

7. In a case-making machine, a picker head adapted to swing to one position to pick up cover-boards and to another to deposit them on a glued cover, radiating pins on said picker head, means for forcing said cover up and for folding it over the edges of the cover-boards, said means for folding having grooves in the face registering with the pins and adapted to overlie the same so as to cause the folded-over edge to be forced into contact with the glued cover between said pins, and means operable on the downward movement of the picker head for withdrawing said pins inwardly from the folded-over edges.

8. In a case-making machine, a picker head adapted to swing to one position to pick up cover-boards and to another to deposit them on a glued cover, radiating pins on said picker head, means for forcing said cover up and for folding it over the edges of the cover-boards, said means for folding having grooves in the face registering with the pins and adapted to overlie the same so as to cause the folded-over edge to be forced into contact with the glued cover between said pins, means operable on the downward movement of the picker head for withdrawing said pins inwardly from the folded-over edges, means for latching said first mentioned means in the inward position, and means for releasing the latching means on the up-stroke of the picker head.

9. In a machine for making round corner cases for books, a platform, means for advancing a glued flexible cover over said platform, a picker head adapted to carry cover-boards to a position above said cover and to press them thereon, said picker head having a plurality of pins extending outwardly from the straight edges, grooved plates movable thereover to fold the margins of the cover over the edges of the cover-boards, a plurality of parallel pins at the corners extending outwardly at substantially 45° from the side pins, a grooved plate movable inwardly over said corner pins to fold the margin in and crimp it between said cover pins where it will be held by the glue on the cover, and means for withdrawing the pins from the turned-over edges.

10. In a machine for making round corner cases for books, a platform of substantially the outline of the finished case, die members through which said platform passes to bend the margins of the cover over the edges of the cover-boards, means for advancing a glued flexible cover over said platform, a picker head adapted to carry cover-boards to a position above said cover and to press them thereon, said picker head having a plurality of pins extending outwardly from the straight edges, grooved plates movable thereover to fold the margins of the cover over the edges of the cover-boards, a plurality of parallel pins at the corners extending outwardly at substantially 45° from the side pins, a grooved plate movable inwardly over said corner pins to fold the margin in and crimp it between said cover pins where it will be held by the glue on the cover, and means for withdrawing the pins from the turned-over edges.

11. In a machine for making round corner cases for books, a platform, means for advancing a glued flexible cover over said platform, a picker head adapted to carry cover-boards to a position above said cover and to press them thereon, said picker head having a plurality of pins extending outwardly from the straight edges, grooved plates movable thereover to fold the margins of the cover over the edges of the cover-boards, a plurality of parallel pins at the corners extending outwardly at substantially 45° from the side pins, said pins extending to substantially the outer edges of said cover-boards, a grooved plate movable inwardly over said corner pins to fold the margin in and crimp it between said cover pins where it will be held by the glue on the cover, and means for withdrawing the pins from the turned-over edges.

In testimony whereof I have hereunto set my hand this 16th day of July, 1927.

JOSEPH V. WHITE.